(No Model.)
E. W. JOHNSON.
MANDREL ATTACHMENT FOR CIRCULAR SAWS.
No. 292,316. Patented Jan. 22, 1884.
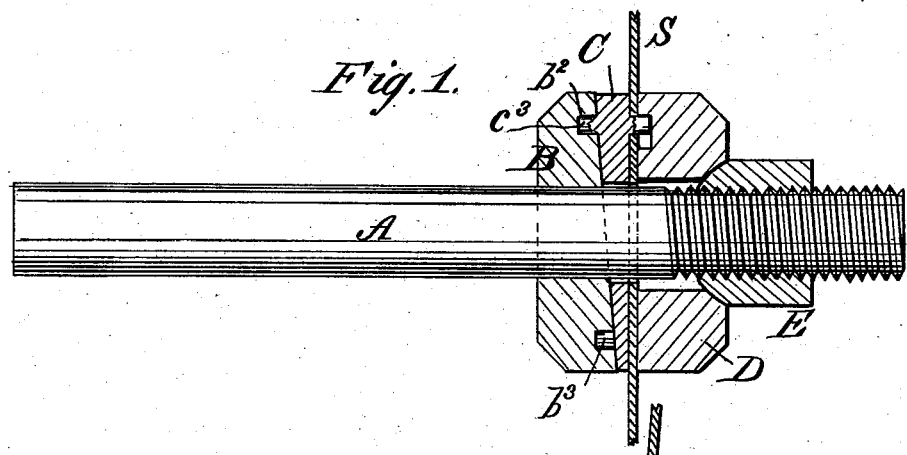
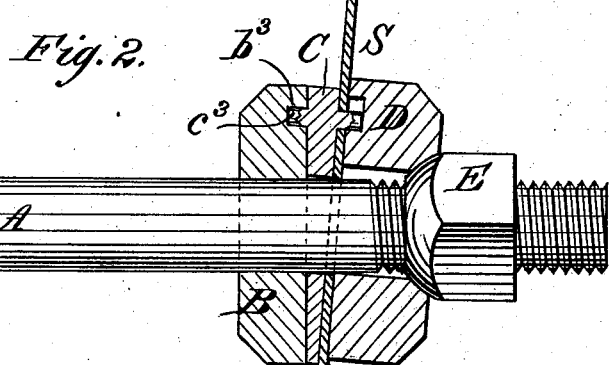
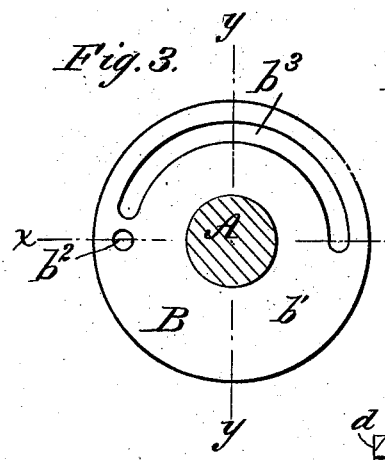
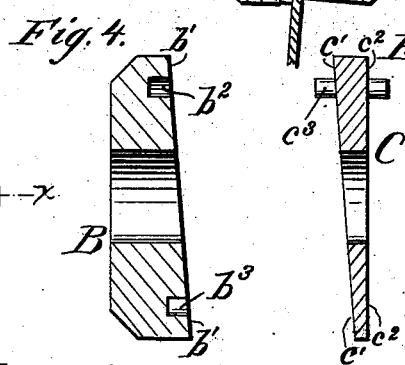
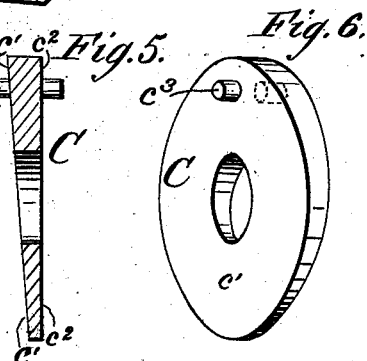
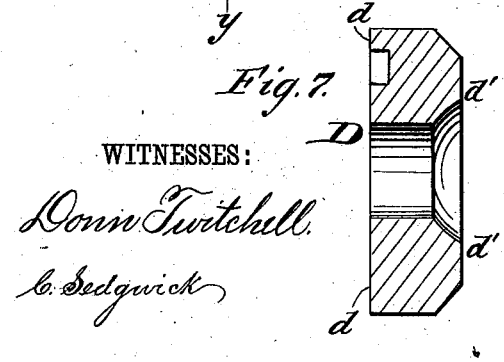
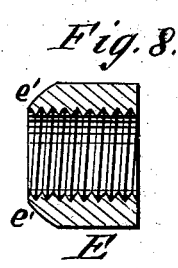
WITNESSES:
Donn Twitchell.
C. Sedgwick
INVENTOR:
E. W. Johnson
BY
Munn & Co.
ATTORNEYS.
N. PETERS. Photo-Lithographer, Washington, D. C.

UNITED STATES PATENT OFFICE.

EDWARD W. JOHNSON, OF WATERBURY, CONNECTICUT.

MANDREL ATTACHMENT FOR CIRCULAR SAWS.

SPECIFICATION forming part of Letters Patent No. 292,316, dated January 22, 1884.

Application filed August 27, 1883. (No model.)

*To all whom it may concern:*

Be it known that I, EDWARD W. JOHNSON, of Waterbury, in the county of New Haven and State of Connecticut, have invented a new and Improved Mandrel Attachment for Circular Saws, of which the following is a full, clear, and exact description.

The object of this invention is the securing of a circular saw to a mandrel at any required angle thereto, whether right or oblique, and thereby enabling the operator to change the angle of the saw on the mandrel, so as to vary the width of the cut or groove to be made.

The invention consists of the detailed construction and combination of parts, substantially as hereinafter fully set forth and claimed.

Reference is to be had to the accompanying drawings, forming part of this specification, in which similar letters of reference indicate corresponding parts in all the figures.

Figure 1 is a longitudinal section through the mandrel-collar, washers, saw, and nut, and represents the saw as placed at right angles to the axis of the mandrel. Fig. 2 is also a longitudinal section, showing the complete device, and represents the saw as standing at an oblique angle with the axis of the mandrel. Fig. 3 is a view of the face of the fixed collar, showing the recesses for the reception of the pin in the adjoining washer. Fig. 4 is a longitudinal section of the fixed collar, and shows the recess for the reception of the pin on the adjoining washer. Fig. 5 is a longitudinal section; and Fig. 6 is a perspective view of the washer which is interposed between the fixed collar and the saw, showing the pin to be inserted in the recess in the face of the collar. Figs. 7 and 8 are longitudinal sections through the washer and nut which secure the saw in its position on the mandrel, showing the ball-and-socket joint on which the washer and nut come together.

A is the mandrel, which is of the ordinary construction.

B is the collar, firmly attached to the mandrel, so that its face $b'$ stands at an oblique angle to the axis thereof. In the face $b'$ of the collar B, and near its outer edge, is a round recess, $b^2$, to receive the pin $c^3$ in the washer C, and also a circular groove or recess, $b^3$, both recesses being made with their centers in the same circle drawn from the center of the collar B.

C is a washer fitting loosely on the mandrel, and which is placed between the collar B and the saw S. One face, $c'$, of the washer C is made at the same angle with its axis as the face of the collar B, the opposite face, $c^2$, of the washer C being made at right angles with its axis, so that the washer is thicker on one side than on the other. On the oblique face $c'$ of the washer C is fixed a pin, $c^3$, in such a position that when it is placed in the round recess $b^2$ in the face of the collar B, the face $c^2$ of the washer C will be at right angles with the axis of the mandrel; but if the washer C be turned around on the mandrel, so that the pin $c^3$ enters any part of the recess $b^3$ in the face of the collar B, then the face $c^2$ of the washer C will stand at an oblique angle with the axis of the mandrel, the extent of the obliquity or divergence from a right angle being proportionate to the extent of the removal of the pin $c^3$ from the round recess $b^2$ in the collar B. Should it be turned one-half way around, the obliquity will be the greatest, and will be equal to double the obliquity of the face $b'$ of the collar B.

D is a washer, and E is a nut for clamping the saw against the face $c^2$ of the washer C, and holding it securely on the mandrel. In the face $d'$ of the washer D is formed a socket to receive the ball end $e'$ of the nut E, so that at whatever angle with the mandrel the face $d$ of the washer D may be the nut E will fit by its ball end $e'$ into the socket of the washer D.

The operation is as follows: If it be required to make a cut equal to the thickness of the saw, the washer C is placed on the mandrel next to the collar B, and so that the pin $c^3$ in the washer C shall enter the recess $b^2$ in the collar B. The saw S is placed next on the mandrel to the washer C, and the washer C and saw S are properly secured in their positions by the washer D and nut E. If it is required to make a cut greater in width than the thickness of the saw, the washer C is so placed on the mandrel that the pin $c^3$ will enter some part of the recess $b^3$ in the collar B, the extent to which the pin $c^3$ is turned away from the round recess $b^2$ in the collar B determining the width of the cut.

Among the advantages obtained by my invention are that the operator is enabled to make cuts of any desired width by the use of only one set of collar and washers, as herein described, whereas by the method in ordinary use numerous sets of collars and washers have to be used, a different set being required for every width of cut made, and a great saving is thereby effected both in the cost of construction and the time and labor of operating.

Having thus described my invention, I claim as new and desire to secure by Letters Patent—

1. In a saw-mandrel attachment, the combination of the fixed oblique-faced collar having the semicircular recess in its face, with the washer, having one face at an oblique angle, and its other face at a right angle, to its axis, said washer also having a pin to engage with the said recess, substantially as and for the purpose set forth.

2. In a saw-mandrel attachment, the combination of the fixed oblique-faced collar having the same circular and round recesses in its face, with the washer having one face at a right angle, and its other face at an oblique angle, to its axis, said washer having a pin, substantially as and for the purpose set forth.

3. In a saw-mandrel attachment, the combination of the fixed oblique-faced collar having the same circular and round recesses in its face, with the washer having one face at a right angle, and its other face at an oblique angle, to its axis, said washer having a pin, the countersunk washer D, and the convexed nut E, substantially as and for the purpose set forth.

EDWARD W. JOHNSON.

Witnesses:
 ORSON HAYWARD,
 WILLIS JOHNSON.